April 5, 1966     H. DOZIER     3,244,801
TEST JACK TERMINAL
Filed May 5, 1965

INVENTOR.
HILLIARD DOZIER,
BY
ATTORNEYS,

United States Patent Office 3,244,801
Patented Apr. 5, 1966

3,244,801
TEST JACK TERMINAL
Hilliard Dozier, Cincinnati, Ohio, assignor to U.S. Terminals, Inc., Cincinnati, Ohio, a corporation of Ohio
Filed May 5, 1965, Ser. No. 453,406
4 Claims. (Cl. 174—153)

This invention relates to electrical terminals and has to do more particularly with a test jack terminal of the type wherein the terminal is provided with a socket adapted to engage a test point or probe.

In the manufacture of various electrical components and circuitry embodied in electronic devices, it is desirable to provide terminals which may be used for test purposes, such as testing the operability of various conductors and other parts of the circuitry, the probes of the testing equipment being inserted in the various test jacks which assure positive electrical contact between the probes and the conductors connected to the test jacks. Heretofore, such test jacks have been of the press-in type, being composed of an electrode and a surrounding insulator, the insulator having a cylindrical body portion the diameter of which is somewhat greater than the diameter of the opening in the terminal board or chassis to which the test jack is to be secured. The opening in the terminal board is chamfered and it is necessary that the cylindrical body of the insulator be forced or press-fitted in the opening from the chamfered side, the terminal being secured in place by reason of the binding engagement of the insulator with a somewhat smaller opening. Considerable difficulty has been experienced with this type of terminal by reason of a poor fit at the chassis due to extremely close tolerances, and such terminal jacks do not lend themselves to installation by automatic equipment.

In contrast to the foregoing, the instant invention contemplates a test jack terminal which eliminates the foregoing difficulties as well as others inherent in a conventional press-in type of test jacks. Thus, a principal object of the instant invention is the provision of a test jack terminal construction which permits a far wider range of tolerances than embodied in press-in test jacks and at the same time assures a positive locking engagement with the terminal board or chassis. To this end, the instant test jacks embody the locking principle of the terminals disclosed in Dozier U.S. Patent 3,095,470 wherein the electrode coacts with the insulator to effect positive locking engagement of the terminal with the terminal board, the electrode being axially displaceable relative to the insulator after the terminal has been inserted in the opening in the terminal board.

A further object of the instant invention is the provision of a test jack terminal in which the probe receiving socket in the electrode is maintained in constricted condition by the surrounding insulator, thereby assuring positive electrical contact between the socket and a probe inserted therein.

Still a further object of the instant invention is the provision of a test jack terminal of the character described wherein the lip of the probe receiving socket is recessed within a counterbore in the surrounding insulator where it is shielded from accidental contact.

Still another object of the instant invention is the provision of a test jack terminal which, due to its construction and the manner in which the parts are associated, permits extra clearance on the terminal board in that substantially equal portions of the terminal lie on opposite sides of the terminal board, whereas in a conventional press-fit terminal the major extent of the terminal lies to one side of the terminal board, thereby requiring a greater clearance.

The foregoing together with other objects of the invention which will appear hereinafter or which will be apparent to the skilled worker in the art upon reading this specification, are accomplished by those constructions and arrangement of parts of which certain exemplary embodiments shall now be described.

Reference is made to the accompanying drawings wherein.

Figure 1:
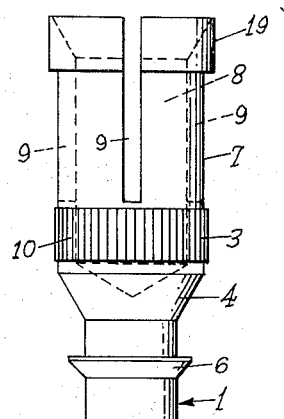
FIGURE 1 is an exploded view of an electrode and insulator for a test jack terminal, the electrode being shown in elevation and the insulator in section.

Referring first to FIGURE 1 of the drawing, the test jack terminal comprises an electrode 1 adapted to be inserted in the insulator 2. The electrode 1 will be formed from a conductive metal, and in the case of a test jack the metal is preferably beryllium copper in that such metal possesses the desired resiliency to effect clamping engagement with the test point or probe, as will be explained more fully hereinafter. The insulator 2, on the other hand, will be formed from a relatively hard yet distortable material, such as Teflon or other insulating material possessing the required dielectric properties.

The electrode 1 has an enlarged body portion 3 overlying an expansion shoulder 4 and a post or pin 5 which, when the test jack is in use, is adapted to receive one or more wires or conductors which are secured to the electrode pin. The electrode pin is also provided with an annular barb 6 which, as will be explained hereinafter, coacts with the insulator to secure the parts together. The enlarged body portion 3 terminates upwardly in a socket 7 having a bore 8, the socket being divided into quadrants by opposing pairs of vertically disposed slots 9 which permit the walls of the socket to be compressed radially inwardly so as to thereby enter into tight gripping engagement with a test probe inserted in the bore 8. Preferably, the annular wall surface of the enlarged body portion 3 will be knurled or milled, as indicated at 10, so that it will enter into biting engagement with the insulator and prevent relative rotation of the parts.

The insulator 2 has a cylindrical body portion 11 terminating at one end in an enlarged head 12, the insulator having a first bore 13 extending axially therethrough from the enlarged head of the insulator, the bore 13 opening at its opposite end into an enlarged counterbore 14 projecting inwardly from the free end 15 of the cylindrical body 11.

Figure 2:
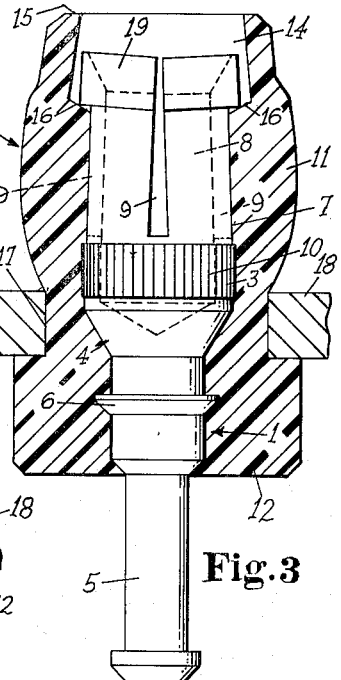
FIGURE 2 is a vertical sectional view illustrating the insertion of the terminal in a terminal board prior to locking displacement of the electrode.

The electrode and insulator will be factory assembled, the terminal being shipped to the user in the condition illustrated in FIGURE 2 wherein it will be seen that the annular barb 6 of the electrode is in biting engagement with the wall surface of the bore 13 in the insulator and with the expansion shoulder 4 substantially coincident with the preferably tapered seat 16 which interconnects the bore 13 and enlarged counterbore 14. It will also be noted that the enlarged body portion 3 lies within the confine of the counterbore 14, and the dimensioning of the parts is preferably such that the body portion 3 will be freely received within the counterbore 14 so as not to expand it radially outwardly and thereby interfere with the association of the terminal with the opening 17 in a terminal board or chassis 18 with which the terminal is associated.

As will be evident from FIGURE 2, the pre-assembled terminal is inserted in the opening 17 in terminal board or chassis 18 with the cylindrical body portion of the insulator passing through the opening in the terminal board so that the enlarged head 12 seats against the terminal board 18. Upon being so inserted, the insulator will be supported from beneath, whereupon the electrode 1 will be displaced axially downwardly until the parts assume the condition illustrated in FIGURE 3, wherein it will be seen that the expansion shoulder 4 in enlarged body portion 3 has been forced into the bore 13, thereby expanding the cylindrical body portion of the insulator radially outwardly. The insulator is thus permanently locked to the terminal board by the bulging of the cylindrical body portion 11 in an area immediately beyond the terminal board 18 on the side thereof opposite the enlarged head 12 of the insulator. It will also be noted that the bulk of the socket member 7 is forced into the smaller diameter bore 13. Usually, the socket member will be crimped inwardly prior to the assembly of the electrode and insulator, made possible by the slots 9, and the socket will be supported in the inwardly flexed or crimped condition by surrounding portion of bore 13.

It has been found desirable to provide the free end of the socket 7 with a slightly enlarged annular lip 19 which may be readily machined in the electrode as an incident of its manufacture, such lip being adapted to contact and bear against the seat 16, thereby establishing the final position of the electrode relative to the insulator and at the same time placing the cylindrical body portion of the insulator under axial compression to assist in maintaining it in radially expanded condition. The axial displacement of the electrode will have caused the pin 5 to project outwardly beyond the enlarged head 12 of the insulator where it may be readily contacted by the conductors or the like to be secured thereto. The dimensioning of the parts is such that the socket will be wholly contained within the body of the insulator and hence shielded against accidental contact.

Figure 3:
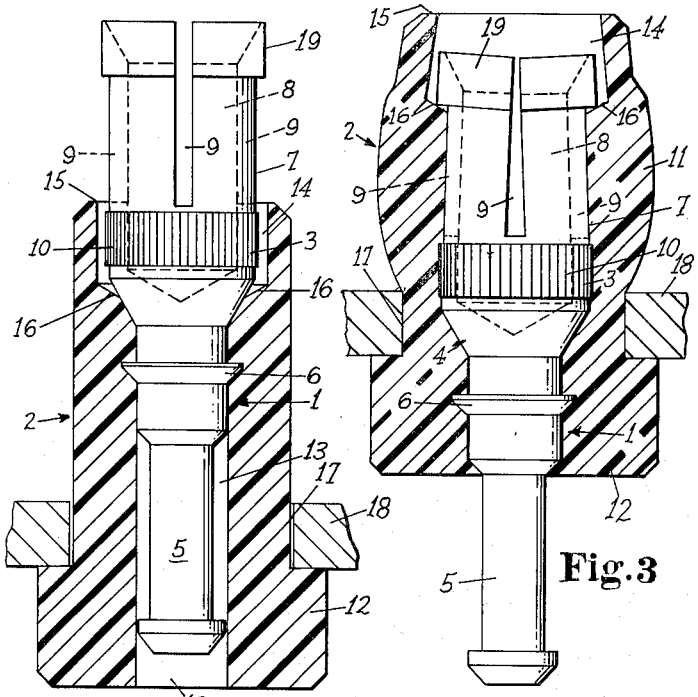
FIGURE 3 is a vertical sectional view similar to FIGURE 2 but illustrating the parts in the locked condition.

The precise dimensioning of the parts is not critical excepting that the diameter of the enlarged body portion 3 of the electrode will be sufficiently greater than the diameter of the bore 13 to effect the desired radial expansion of the insulator; and in the final position of the parts illustrated in FIGURE 3 the enlarged body portion will be positioned so as to effect radial expansion of the cylindrical body of the insulator in an area lying immediately beyond the terminal board on the side thereof opposite the enlarged head of the insulator. It is also preferred that the socket 7 be of a larger diameter than the bore 13 so that the wall surface of the bore will press against the wall surfaces of the socket, thereby holding them in the contracted condition illustrated in FIGURE 3. Yet when a test point or probe is inserted in the bore 8 of the socket, the distortable character of the material from which the insulator is formed together with the resiliency of the metal from which the electrode is formed permit the socket to expand radially outwardly both to permit insertion and subsequent release of the test probe. The walls of the socket are nonetheless supported by the surrounding insulator and hence provide a much more positive engagement with the test probe than would be provided by relying solely upon the resiliency of the material from which the electrode is formed. The relative diameters of the bore 13 and the socket 7 may be varied; but as a general rule as the diameters decrease the difference in diameter will decrease. For example, in extremely small size terminals, as where the socket is sized for a 0.040 diameter test probe, the wall thickness of the socket may be reduced by decreasing the outside diameter of the socket to a point where it approaches the diameter of the bore 13. Nonetheless, the supporting function of the insulator will persist due to plastic flow of the insulator material induced by the enlarged body portion 3.

Figure 4:
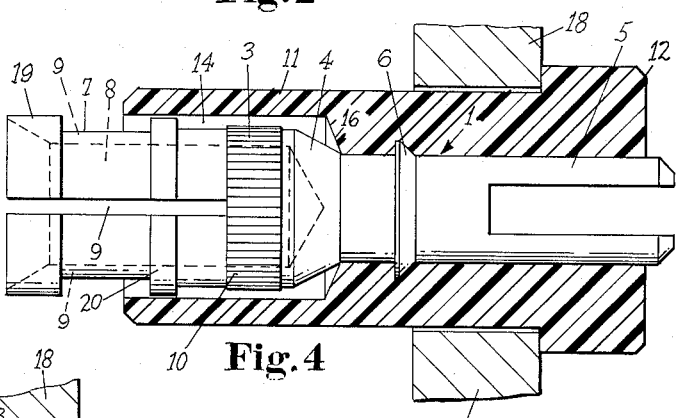
FIGURE 4 is a vertical sectional view similar to FIGURE 2 but illustrating a modified form of construction.
Figure 5:
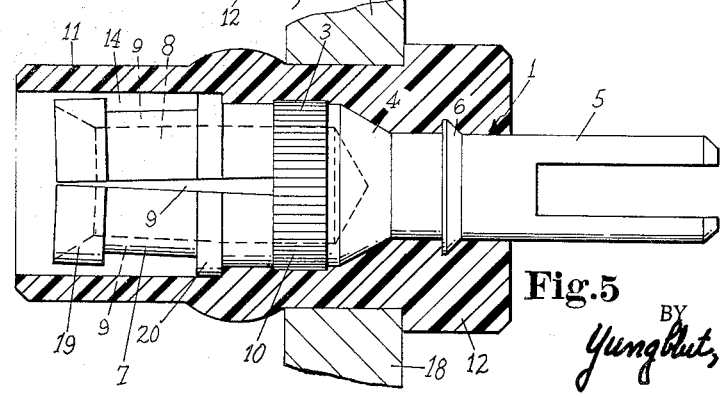
FIGURE 5 is a vertical sectional view illustrating the terminal of FIGURE 4 in the locked condition.

FIGURES 4 and 5 of the drawings illustrate a modification of the invention wherein the socket portion of the electrode is provided with an enlarged rim 20 which acts as a stop and as a compression ring when in contact with the seat 16 in the counterbore 14, the rim 20 additionally serving to expand the cylindrical wall portion of the insulator radially outwardly to thereby coact with the enlarged body portion 3 to lock the terminal to the terminal board. In this embodiment of the invention, it will be noted that a portion at least of the socket 7 is not directly contacted by the wall surfaces of the counterbore 14, although the socket is nonetheless effectively supported and maintained in contracted condition by reason of the rim 20 and also by reason of the lowermost portion of the socket having entered the bore 13.

It will be noted that in both of the foregoing embodiments, the cylindrical body portion of the insulator projects outwardly from one side of the terminal board, whereas the electrode post projects outwardly from the other side of the terminal board. This arrangement effectively brings the opposite ends of the terminal closer to the terminal board than would be the case where the major portion of the terminal on one side of the board, thereby providing extra clearance and facilitating closer density stacking of the terminal boards in use.

It has already been indicated that the size and dimensions of the terminals do not constitute limitations on the invention excepting as to the relative dimensioning of the parts required to effect expansion of the body portion of the insulator and provide support for the socket; and it will be obvious that the dimensions must be such that the terminal may be freely inserted into the openings in the terminal board. Similarly, the configuration of the electrode post does not constitute a limitation on the invention, and the posts will be configured in accordance with their intended use and may be provided with heads, cross-bores or they may be bifurcated. The number of slots in the socket may be varied, as may the lengths of the electrode pins depending upon the requirements of use. The annular barbs 6 will preferably be in biting engagement with the wall surfaces of the bore 13, but if desired the annular barbs may be arranged to seat against the external surface of the enlarged head of the insulator. It is also possible to provide the insulator with a plurality of bored sections of different diameters, depending upon the configuration of the electrode. Other modifications of the invention will undoubtedly occur to the skilled worker in the art upon reading this specification, and consequently it is not intended that the invention be limited in any manner excepting as set forth in the claims which follow.

The embodiments of the invention in which an exclusive property or privilege is claimed are defined as follows:

1. A test jack terminal comprising an insulator and an electrode, said insulator having a cylindrical body part terminating at one end in an enlarged head, said insulator being formed from a distortable dielectric material and having an axial bore composed of a plurality of sections one of which comprises an enlarged counterbore extending inwardly from the outermost end of the cylindrical body part of the insulator and terminating in a seat surrounding an adjoining section of the bore which is of a smaller diameter than said counterbore, said electrode comprising an elongated metallic member inserted in the insulator from the outermost end of said cylindrical body part, said electrode having a post at one end which extends through said bore in the direction of the enlarged head of the insulator, an enlarged centrally disposed body portion, and a socket on the side of the enlarged body portion opposite said post, said socket having an annular wall interrupted by a plurality of slots extending lengthwise of the socket and acting to dived said annular wall into segments capable of being radially compressed, the outside diameters of said enlarged body portion and said socket being greater than the diameter of the section of the bore lying beyond said seat, said socket having an annular projection of a size to fit within said counterbore but of an effective diameter greater than the diameter of the said bore section lying beyond said seat, the depth of said counterbore being such that upon insertion of the cylindrical body portion of the insulator in a terminal receiving opening in a terminal board with the undersurface of the enlarged head seated against one face of the terminal board with the said annular projection in contact with said seat, the enlarged body portion of the electrode and a portion at least of the socket will be forced into the smaller diameter section of the bore lying beyond said seat on the side of the terminal board opposite said enlarged head, the cylindrical body portion of the insulator being thereby expanded radially outwardly in the area between said terminal board and said annular projection to lock the terminal to the terminal board, with the socket effectively maintained in a radially compressed condition.

2. The test jack terminal claimed in claim 1 wherein said electrode includes an annular barb, wherein said barb is adapted to engage said insulator at a point remote from the seat in said bore, said barb and said annular projection coacting to place the portion of the insulator lying therebetween in compression.

3. The test jack terminal claimed in claim 2 wherein said annular projection comprises a lip surrounding the outermost free end of said socket.

4. The test jack terminal claimed in claim 2 wherein said annular projection comprises a rim lying intermediate the opposite ends of said socket.

References Cited by the Examiner

UNITED STATES PATENTS

| 2,751,809 | 6/1956 | Barker | 85—82 |
| 2,931,008 | 3/1960 | Abrams | 174—153 X |
| 2,995,617 | 8/1961 | Maximoff et al. | 174—153 |
| 3,095,470 | 6/1963 | Dozier | 174—153 |
| 3,136,204 | 6/1964 | Reynolds | 85—77 |
| 3,181,104 | 4/1965 | Oxley | 174—153 X |

FOREIGN PATENTS 856,808  12/1960  Great Britain.

LARAMIE E. ASKIN, *Primary Examiner.*